United States Patent
Holtman et al.

(10) Patent No.: US 9,559,754 B2
(45) Date of Patent: Jan. 31, 2017

(54) WIRELESS DOCKING LINK EFFICIENCY IMPROVEMENT SYSTEM

(71) Applicant: KONINKLIJKE PHILIPS N.V., Eindhoven (NL)

(72) Inventors: Koen Johanna Guillaume Holtman, Eindhoven (NL); Maurice Herman Johan Draaijer, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 61 days.

(21) Appl. No.: 14/350,406

(22) PCT Filed: Oct. 3, 2012

(86) PCT No.: PCT/IB2012/055295
§ 371 (c)(1),
(2) Date: Apr. 8, 2014

(87) PCT Pub. No.: WO2013/054232
PCT Pub. Date: Apr. 18, 2013

(65) Prior Publication Data
US 2014/0242911 A1 Aug. 28, 2014

Related U.S. Application Data

(60) Provisional application No. 61/545,289, filed on Oct. 10, 2011.

(51) Int. Cl.
*H04B 5/00* (2006.01)
*G06F 1/16* (2006.01)
*H01Q 1/24* (2006.01)

(52) U.S. Cl.
CPC .......... *H04B 5/0031* (2013.01); *G06F 1/1632* (2013.01); *H01Q 1/243* (2013.01)

(58) Field of Classification Search
CPC ............ H04B 5/02; H04B 5/0012; H04B 5/00
USPC .............. 455/41.1, 41.2, 575.5, 575.7, 562.1
See application file for complete search history.

(56) References Cited

U.S. PATENT DOCUMENTS

| | | | |
|---|---|---|---|
| 8,773,316 B2 | 7/2014 | Van Den Elzen | |
| 2003/0080853 A1 | 5/2003 | Tuttle | |
| 2007/0120752 A1* | 5/2007 | Takasu | G06F 1/1616 343/702 |

(Continued)

FOREIGN PATENT DOCUMENTS

DE   10357665 A1   7/2004

OTHER PUBLICATIONS

Zhu J. et al., "Adaptive CSMA for Scalable Network Capacity in High-Density WLAN: A Hardware Prototyping Approach", INFOCOM 2006, 25th IEEE International Conference on Computer Communications Proceedings.

*Primary Examiner* — April G Gonzales
(74) *Attorney, Agent, or Firm* — Larry Liberchuk

(57) ABSTRACT

A wireless docking system in a shared radio spectrum environment including: a docking station (320) configured with a radio (322) connected to an antenna (324); a dockee (310) configured with a radio (312) connected to an antenna (314) and using a radio standard with a carrier sensing mechanism for communication with the docking station; and an antenna efficiency reduction device (328) that reduces the sensitivity of the carrier sense mechanism in the dockee when the dockee is physically docked with the docking station.

15 Claims, 5 Drawing Sheets

(56) References Cited

U.S. PATENT DOCUMENTS

| | | | |
|---|---|---|---|
| 2007/0182367 A1* | 8/2007 | Partovi | H01F 5/003 320/108 |
| 2009/0096413 A1* | 4/2009 | Partovi | H01F 5/003 320/108 |
| 2009/0298553 A1* | 12/2009 | Ungari | H04M 1/7253 455/573 |
| 2010/0041333 A1* | 2/2010 | Ungari | H02J 7/00 455/41.2 |
| 2010/0057969 A1* | 3/2010 | Meiri | G06F 1/1632 710/303 |
| 2014/0120837 A1* | 5/2014 | Abiri | H04W 28/02 455/41.2 |
| 2014/0342669 A1* | 11/2014 | Zeung | H04M 1/7253 455/41.2 |

* cited by examiner

WIRELESS DOCKING LINK EFFICIENCY IMPROVEMENT SYSTEM

This invention relates to wireless docking and, more particularly, to a wireless docking antenna detuner for link efficiency improvement and optimization.

Wireless docking uses wireless technologies to connect portable devices, such as mobile phones, laptops, etc. to typically stationary docking environments. Such a portable device is called a dockee or wireless dockee. The wireless docking environment gives the dockee access to peripherals, such as a large screen, a keyboard, a mouse, and input/output ports that can be used to improve the experience and the productivity of the end user when interacting with applications running on the dockee. One example for wireless docking is to give the user of a mobile phone the ability to use a bigger screen, such as a TV or PC monitor, when interacting with an application, such as an e-mail client or a web browser, running on the mobile phone.

To realize wireless docking, the dockee connects wirelessly to one or more wireless docking stations, also known as wireless docking hosts, in order to gain access to the peripherals in the wireless docking environment. In a simple case, the wireless docking environment is realized by having at a location (in a living room, on a desk in an office, etc.) a single wireless docking station to which peripherals like TVs, PC monitors, keyboards, etc. are all connected. In one specific example, a Bluetooth wireless keyboard and a USB webcam could be connected to a docking station in order to become part of a docking environment. Thus, the dockee would be connected to the wireless keyboard and USB webcam after docking with the docking station.

In practical terms, Wi-Fi will be the most logical wireless protocol to enable wireless docking between the docking station and the dockee device, as many (potential) dockee devices come with Wi-Fi support already built in. However, a full wireless docking system that aims to ensure cross-device and cross-manufacturer compatibility between different dockees and docking stations in a user-friendly way is further defined by a set of mechanisms or protocols between dockees and docking stations that realize easy and convenient automatic Wi-Fi connection setup between the dockee and the docking stations with their associated peripherals.

In the wireless docking environment, the state of 'being docked' in this context—the docked state—is the state where a dockee has access to all peripherals in the wireless docking environment, or at least to all peripherals in the wireless docking environment that the dockee has chosen to access. The grouping of many peripherals into a single wireless docking environment and allowing the user to connect the dockee with all peripherals in the wireless docking environment by initiating a single 'dock' action is an important concept to enable ease of use. The state of being 'undocked' is a state where there is no access to any of the peripherals in the wireless docking environment. Preferably, the docking and undocking procedures are both as automatic as possible, requiring minimal user intervention and minimal prior configuration by a user.

A docking station could be realized in many ways. It could be a specially designed single-purpose device, or it could be, e.g., a PC running some software applications, which may have some extra hardware attached to make docking more convenient and/or efficient. An HDTV might also have built-in functionality to act as a docking station. One design option that is considered for all these classes of docking stations is to equip the station with a cradle, in which the dockee can be placed. The placing of the dockee in the cradle will generally have the effect of triggering a dock action. Another option is to equip the docking station with a docking pad, a surface onto which the dockee can be laid down. Again, the laying down would trigger a dock action, at least when the dockee was in the undocked state before.

Equipping a docking station with a cradle, pad, or other demarcated area has the advantage that if a single room or single area in a building contains many docking stations all within potential wireless range, there will be an easy way for a user to indicate which station and implied wireless docking environment the user wants to dock with. Another trigger action may be by using a menu on the dockee device. For example, in a living room when a user is sitting in a chair with the dockee device in their hand, it would be convenient to trigger a docking action with a docking station that is not within arm's reach by a using a menu on the dockee. Additional triggers to get from an undocked to a docked state include (a) the scanning of an NFC (Near Field Communication) tag on a docking station by a dockee, or by (b) the user pressing a specific button on the dockee, or (c) on the docking station. A maximally useful wireless docking standard should enable many of these types of trigger actions, giving device manufacturers and end users the choice to select what is most convenient for them.

To create maximum user friendliness, the triggering of an 'undock' action should not always be the inverse of a triggering of a 'dock' action. For example, if docking can be initiated automatically by the user placing a mobile phone dockee on a docking pad, then it may not be convenient if undocking happens automatically when the user picks up the mobile phone to answer a call. A Wi-Fi link between the phone and the docking station can be maintained just as well when the user has picked up the phone from the docking pad, though in some cases the throughput of the link may suffer by the user blocking a direct signal path with their body.

If a dockee is laid on a docking pad, positioned in a cradle, or placed by the user inside an area (physically demarked, or just known to exist) that is associated with a docking station or docking environment, the dockee is considered to be in the state of being 'physically docked.' If a dockee enters the state of being physically docked, this may trigger a docking action, resulting in the dockee also becoming logically docked. If the dockee leaves the state of being physically docked, it might not necessarily stop being logically docked.

Physical docking could be done by a user for a number of reasons, and several of these reasons may apply at the same time:

1. To trigger a logical docking process.
2. To ensure that the dockee is connected to a power source, e.g. wireless charging by placing a phone on a charging pad.
3. To optimize, or make more predictable, the quality of the wireless communication between the dockee and the docking station/docking environment. The quality (speed, latency) and predictability of the communication will have an effect on utility of the combination of the dockee with the peripherals in the docking environment.
4. To create an input to a security mechanism, so that (a) the docking process can proceed more securely and/or (b) the docking process can omit some security dialog steps that the user would have to go through otherwise when logically docking from a distance. Wireless connections can be subject to man-in-the-middle attacks by which a (remote) attacker with the right equipment can impersonate being a dockee to a docking station, or a docking station to a dockee. While well-known mechanisms like pin code authentication (from Bluetooth) can lower the chance of successful attacks, these are not user-friendly. Physical docking, with a detection mechanism for physical docking that is hard for a remote man-in-the-middle attacker to influence is therefore an important route to enhancing security, but should not be at the expense of user friendliness.

Several important process elements are identified for the process that leads from an undocked to a docked state. These process elements do not have to occur in a fixed order, nor have to occur always for every type of envisaged docking process. Some of these elements are:

1. A trigger or kickoff mechanism/event that gets the docking process going, where this trigger may select a single wireless docking environment among multiple wireless docking environments that are all in wireless range.
2. The creation of one or more secure wireless connections between the dockee and docking station(s) or other elements in the docking environment, with the initialization of these secure connections often relying on 'trust relation creation/detection' mechanisms that guard against a man-in-the-middle attack.
3. The selection of optimal wireless protocols and interface settings to use for communications to and from peripheral functions in the docked state, e.g. Wi-Fi channel.

Current docking and charging cradles use electrical contact points to make charging and/or data connections. The disadvantages to this approach are that the contacts may get dirty, so they no longer work well over time, and that the contact points are an impediment to achieving aesthetics in the styling of the mobile device.

A wireless standard like Wi-Fi may be used to support wireless docking. Wi-Fi works on an open (ISM) frequency band, so Wi-Fi connections can be subject to interference from other users of the same channel, such as other Wi-Fi users. To prevent a communications breakdown due to this interference, Wi-Fi is designed to share the channel by having all devices use the CSMA (carrier sense multiple access) mechanism. This mechanism ensures that all devices in range of each other take turns in sending packets.

FIG. 1 shows the situation where dockees A 110 and E 130, docking stations B 120 and D 140, a Wi-Fi router 150, and a laptop computer 160 are using the same wireless channel C. Furthermore, a non-Wi-Fi wireless device 170 is transmitting information on the wireless channel C, or overlapping with wireless channel C. The boundary 180 indicates a range at which dockee 110 can pick up a signal from another device using channel C. This is a simplification, as the range can be different depending on type and transmit power settings of the other devices. For dockee A 110 docked to a docking station B 120 using wireless channel C, this means that when dockee E 130, or docking station D 140, router 150, laptop computer 160 or wireless device 170 are actively using the same wireless channel C—or a partially overlapping channel—being in the range 180 of the dockee A 110, their use of the channel causes performance degradation for dockee A 110, as compared to the performance when no other active users are present. This is due to the fact that the carrier sense mechanisms in dockee A 110 and docking station B 120 will hold off using the channel C if they sense another device using the channel. This degradation can cause, for example, degradation in screen updating speed that makes it impossible to comfortably watch a video via the wireless docking connection, even though it will not cause a complete loss of the connection.

Let it be assumed that device A 110 in FIG. 1 is a general-purpose device, such as a mobile phone, using 802.11n ('Wi-Fi n') radio. Under normal circumstances, the range at which the carrier sense mechanism of device A 110 picks up signals might be indicated by the area 180. The carrier sense (or carrier detection) mechanism in a compliant 802.11n device, such as device A 110, is required to prevent transmissions by the device if either of the following is true:

1. A radio signal encoded according to the Wi-Fi standard is sensed in the channel, with a signal strength of at least X db.
2. Any signal is sensed in the channel, with a signal strength of at least X+Y db. (i.e., the signal has to be significantly stronger than in the first condition).

The exact values for X and Y, in the case of 802.11n, may be found in section 20.3.22.5 of the IEEE 802.11n-2009 standards document. For some signal coding in some earlier Wi-Fi standards, the second condition does not always need to be implemented.

The above two conditions mean that transmissions by any of the devices 130, 140, 150, 160 and 170 may cause device A 110 to wait before accessing the channel, causing a performance degradation in the communication between dockee A 110 and docking station B 120.

A particular problem is that a general-purpose 802.11n radio implementation, as expected to be present in dockee A 110, respects the above constraints when it can transmit, even if dockee A 110 itself is transmitting at a low power $Z \ll X$, making it very unlikely that this transmission would interfere with the concurrent use of channel C by devices 130, 140, 150, 160 and 170. The Wi-Fi standard (and most wireless standards) were not designed with the special case of radio communication over a very short distance in mind. Hence, common implementations of these standards may not make exceptions to optimize this case. A certification regime may even disallow them from making certain exceptions.

One way to improve performance in the situation of FIG. 1 is to isolate devices A 110 and B 120 from their environment, for example by enclosing them into a faraday cage. However, this is not a practical solution for the case of wireless docking. Another way is to ensure that most devices in the area use different, non-overlapping channels. However, the number of channels available for use by 802.11n radios is limited, so this is only a partial solution at best. For example, in an open plan office building, assuming one docking station per desk (per employee) and an average floor space of 5×5 meters per employee, 99 other docking stations can be found on the same floor within a 50×50 meter grid around a single docking station. If channel-bonded 802.11n is used, there are only some 10 non-overlapping channel pairs to choose from. This means that in an office environment, FIG. 1 shows a realistic, maybe even optimistic, representation of other in-range devices under the assumption that only devices using the same channel are shown.

In the paper "Adaptive CSMA for Scalable Network Capacity in High-Density WLAN: A Hardware Prototyping Approach," by Zhu, J. Metzler, B. Guo, X. Liu, Y, in: INFOCOM 2006, 25th IEEE International Conference on Computer Communications Proceedings (hereinafter the paper), the authors describe this problem and point out that in dense WLAN environments the high sensitivity of the carrier sense mechanism can be a performance problem. The authors propose solving it by having the devices concerned use a built-in carrier sense level (CAA) adaptation algorithm (FIG. 3 in the paper) to steer towards a higher threshold (stronger signal strength) for the carrier sense mechanism. FIG. 11(a) in the paper shows, for a test in an open plan office shown in FIG. 9 of the paper, the performance improvements they achieve using this technique. Certain embodiments herein differ in several important aspects from the approach advocated in this paper. For example, certain embodiments herein do not rely on any built-in mechanism in the dockee that makes the carrier sense mechanism of dockee use a different threshold. Additionally, certain embodiments herein do not use a control loop to achieve an optimal setting for the threshold by using properties of the radio environment. In further contrast, certain embodiments herein utilize the concept of physical docking as a discriminator between entering a 'normal' carrier sense regime and a modified carrier sense regime.

Upon application of an embodiment of the invention described herein, the range as shown in FIG. 1 in which dockee A 110 can pick up a signal from another device using, for example, channel C is reduced as indicated by the smaller range indicated by 190. Thus, even if there are Wi-Fi devices or other devices in the range that use channel C, and/or an overlapping channel, there is an improved performance of the link between the dockee and docking station according to an embodiment of the present invention. This is particularly desirable if many wireless docking stations are all very close to each other in a single room or area, e.g. in a web cafe or in an open-plan office.

Certain embodiments create a good wireless link budget between a sender (for example, Dockee A 110) and a receiver (for example, Docking station B 120), and to keep the link budget high no matter what happens in the environment. Note that a link budget is understood as the accounting of all of the gains and losses from the transmitter through the medium to the receiver in a telecommunication system. This embodiment maximizes the data rate and minimizes the times when the connection drops temporarily (e.g. no packet transmissions are possible for 0.1 seconds) due to causes like interference, link quality deterioration because of multipath effect or people or objects moving between the antennas, etc.

Further embodiments implement the dockee as a general purpose (Wi-Fi) device using standard technology.

In a first embodiment of the invention, a wireless docking system in a shared radio spectrum environment includes: a docking station configured with a radio connected to an antenna; a dockee configured with a radio connected to an antenna and using a radio standard with a carrier sensing mechanism for its communications with the docking station; and an antenna efficiency reduction device that reduces the sensitivity of the carrier sense mechanism in the dockee when the dockee is physically docked.

In a second embodiment, when the dockee is physically docked with the docking station of the first embodiment, the transmit power of the radio in the dockee is regulated to be lower than when the dockee is physically undocked from the docking station.

In a third embodiment, the radio in the dockee of the first embodiment is configured to switch between at least two carrier sense threshold settings.

In a fourth embodiment the dockee of the first embodiment further comprises a first charging coil, and the docking station further comprises a second charging coil, wherein the second charging coil is aligned with the first charging coil for charging the dockee when physically docked.

In a fifth embodiment, a docking station for wireless docking with a dockee in a shared radio spectrum environment, wherein the dockee is configured with a radio connected to a first antenna and using a radio standard with a carrier sensing mechanism for communication with the docking station, the docking station comprising: a radio connected to a second antenna; and an antenna efficiency reduction device that reduces the sensitivity of the carrier sense mechanism in the dockee to signals transmitted by other devices in the shared radio spectrum environment when the dockee is physically docked with the docking station.

In a sixth embodiment, the antenna efficiency reduction device of the fifth embodiment is a detuning device that shifts the natural resonant frequency of the first antenna.

In a seventh embodiment, the antenna efficiency reduction device of the fifth embodiment is a radio absorber, reflector or shield that attenuates radio signals received by the dockee from transmissions by the other devices.

In an eighth embodiment, the detuning device of the sixth embodiment comprises a conducting metal that couples with the first antenna.

In a ninth embodiment, the antenna efficiency reduction device of the fifth embodiment is a detuning device that makes the first antenna less efficient by creating an electromagnetic coupling between different elements of the first antenna that are designed to be electrically isolated from each other.

In an tenth embodiment, the detuning device of the sixth embodiment comprises a plurality of conducting metal strips that couple with the antenna in the dockee.

In a eleventh embodiment, the detuning device of the sixth embodiment comprises a plurality of conducting metal elements that are connected to each other via at least one resistor, and wherein the at least one resistor dissipates the electromagnetic field power flowing through the plurality of conducting metal elements.

In a twelfth embodiment, a connection to the at least one resistor of the eleventh embodiment is made via a switch.

In a thirteenth embodiment, the antenna efficiency reduction device of the fifth embodiment can be switched on or off.

In a fourteenth embodiment, the radio in the docking station of the fifth embodiment is connected to a plurality of antennas, wherein each of the plurality of antennas is positioned such that the link budget is optimized for a particular type of dockee.

In a fifteenth embodiment, the docking station of the fifth embodiment further comprises an alignment structure for aligning a docked dockee, such that the first antenna is aligned in a predefined configuration with the antenna efficiency reduction device in the docking station.

In a sixteenth embodiment, the alignment structure of the fifteenth embodiment comprises a particular shape for the docking station to allow the dockee be placed into or onto the docking station only in a specific position.

In a seventeenth embodiment, the alignment structure of the fifteenth embodiment comprises a moving part on which the second antenna is mounted, such that the moving part can be moved to a location where the second antenna is aligned with the first antenna.

In an eighteenth embodiment, the docking station of the seventeenth embodiment further comprises a first charging coil for charging via electromagnetic coupling with a second charging coil located in the dockee, wherein the charging coils also serve as an electromagnet that moves the moving part.

In an nineteenth embodiment, the alignment structure of the fifteenth embodiment comprises a slotted structure for the docking station, open on one side and closed on the other side, to allow the dockee be placed into the slotted structure touching the closed side of the slot.

In a twentieth embodiment, a docking station for wireless docking with a dockee, in a shared radio spectrum environment, wherein the dockee is configured with a radio connected to an antenna and using a radio standard with a carrier sensing mechanism for communication with the docking station, the docking station comprising: a central unit having a radio; an antenna module; and an antenna efficiency reduction module for reducing efficiency of the first antenna in the dockee by reducing sensitivity of the carrier sense mechanism; wherein the central unit has an interface for plugging into the antenna module and the antenna efficiency reduction module.

In general, the various aspects of the invention may be combined and coupled in any way possible within the scope of the invention. The subject matter that is regarded as the invention is particularly pointed out and distinctly claimed in the claims at the conclusion of the specification. The foregoing and other features and advantages of the invention will be apparent from the following detailed description taken in conjunction with the accompanying drawings. The following drawings are example constructions and are not intended to limit the scope of the invention.

The following embodiments describe a dockee carrier sense modification device. This dockee carrier sense modification device modifies the properties of the carrier sense mechanism in the dockee, when the dockee is physically docked with the docking station. Preferably, the dockee carrier sense modification device modifies the properties without requiring any changes to be made to the dockee. For example, no changes in software, hardware, settings, or the network protocol standard used by the radio of the dockee. As described in certain embodiments herein, the modifying effect of the carrier sense mechanism causes the dockee to become less able—preferably unable—to detect the radio signals from other devices (such as devices 130, 140, 150, 160 and 170 shown in FIG. 1), without losing its ability to detect the radio signals from the docking station. The specification and figures herein only discuss devices using channel C. However, the invention is not limited to channel C, and there might also be other devices using other channels in the same room(s).

'Detection' is defined operationally as 'detection happens whenever the carrier sense mechanism signals to other elements of the MAC layer implementation in the dockee that a carrier is sensed'.

In some embodiments, the dockee carrier sense modification device is realized using an antenna efficiency reduction method that reduces the efficiency of the antenna system in a dockee that is used for communication over a channel C, when the dockee is physically docked with the docking station. For example, the dockee carrier sense modification device may be realized using antenna detuning.

Figure 2:
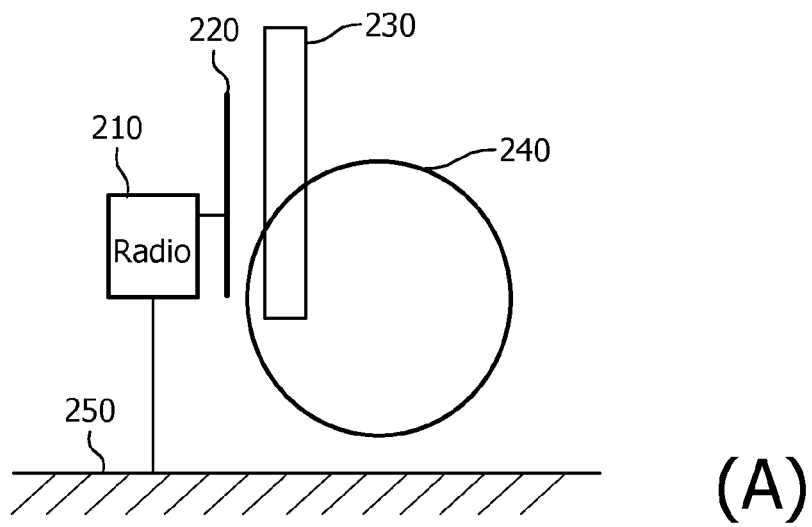
FIG. 2 shows the couplings between antenna systems and detuning objects.
Figure 2:
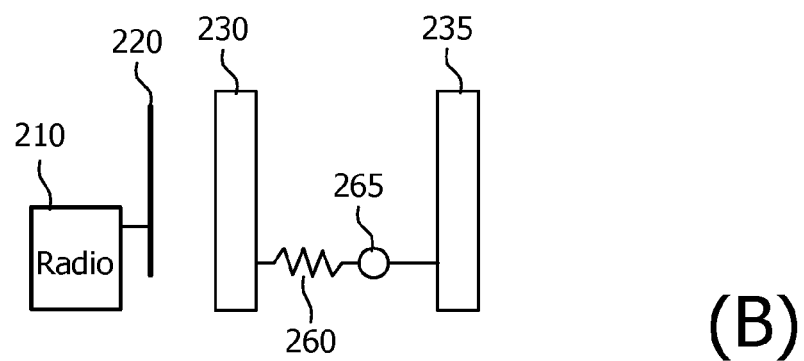
Figure 2:
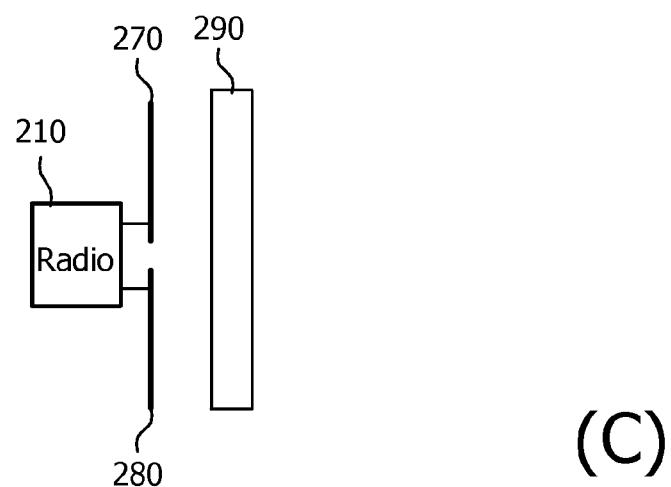

The reception performance of an antenna system, its ability to pick up a signal and convert it into a current strong enough for the radio to make use of it, can degrade if the antenna is detuned. "Detuning" is defined as shifting the natural resonant frequency of the antenna system, making it a less than ideal resonator for picking up signals from an intended channel C. Detuning can happen if a detuning device including a conductive object, or a set of conductive objects, is placed close to an antenna. The conductive object(s) and the antenna become electrically coupled, e.g. through capacitive coupling when they are close-by without touching, or through conductive coupling when electrically non-isolated parts are touching. The coupling changes the electrical characteristics of the antenna, leading to a change in the natural resonant frequency of the entire antenna system. This is illustrated in FIG. 2(A), where a radio 210 is connected to an antenna 220 and to a ground plane 250. Conductive object 230, a length of wire in this example, changes the characteristics of the antenna via capacitive coupling. The wire 230 is longer than the antenna 220, so that the combination of the antenna 220 and the wire 230 forms an electrical system with the wrong resonance frequency when driven by the radio 210. FIG. 2(A) also shows another example of conductive object 240 that "shorts" both the antenna 220 and ground plane 250 to some extent. As the result, radio 210 is made less capable of detecting voltage differences between them and, thereby, less capable of detecting a radio signal.

The conductive body may create an electromagnetic coupling between the antenna and the ground plane without physically contacting them. A conductive object may also have the effect of changing the resonance frequency. Note that conductive objects 230 and 240 do not need to be present at the same time in order for them to have such an effect.

As shown in FIG. 2(B), one embodiment includes a small resistor 260, for example 50 Ohms, inside the shorting circuit thus formed. This resistor converts part of the resonant EM (electromagnetic) field energy flowing through the detuner into heat, starving the radio of EM field energy that it can detect. This resistor 260 may be an actual electrical component, e.g. a surface-mount resistor linking two conductive elements 230, 235 of the detuner, or it may also be realized by making a part of the conductive detuning object very thin and narrow. If the detuner is realized by etching a metal film deposited on a nonconductive surface, this realization form for the resistor may be particularly appealing. The connection to the resistor 260 may be optionally made via a mechanical or electronic switch 265.

A variant of the detuning scenario is one in which the detuning device causes a coupling between two antenna poles in a dipole antenna. This typically not only changes the resonance frequency, but also reduces the efficiency of the antenna system by creating a type of electrical 'short' that reduces the current actually flowing through the radio itself, lowering the capacity of the radio to detect the fluctuating currents created by radio signals in channel C. This embodiment is illustrated in FIG. 2(C), in which a radio 210 is connected to a dipole antenna having poles 270 and 280. The detuning device has a conductive object 290, e.g. a wire, that 'shorts' 270 and 280 to some extent, making the radio 210 less capable of detecting voltage differences between them, and less capable of detecting a radio signal. Conductive object 290 also has the effect of changing the resonance frequency of poles 270 and 280.

Detuning also has the effect of reducing the efficiency by which the antenna system can be used for sending signals, if the radio feeds a current into the system.

A coupled conductive object could create an electrical 'short', reducing radio efficiency, without actually detuning (changing the natural resonance frequency) of the radio circuit. Herein, the common practice will be followed by using the term detuning object to describe the class of all conductive objects that, when placed near to, or in contact with, elements of a radio and antenna system, will cause this system to lose efficiency to support radio reception and/or transmission.

Some wireless devices include active steering means to prevent detuning, but these typically cannot cope with very large objects/couplings.

Some radio system standards, like the 802.11n, allow the use of MIMO (Multiple-Input Multiple-Output): multiple independent antennas coupled to the same radio. In this disclosure, the text and figures usually show the case where only a single antenna is connected to the radio. However, embodiments herein can also be applied if a wireless device has multiple antennas connected to their radios. The use of the term 'antenna system' is intended to include MIMO antenna systems.

Thus, an antenna efficiency reduction device has the effect of reducing the efficiency by which the antenna system of a dockee can pick up signals, and may also have the effect of reducing the efficiency by which the system can send signals. Typically, because of the way radio systems work in a dockee, both efficiencies are reduced at the same time. In terms of the link budget calculation terminology, which is commonly used in radio design, the antenna efficiency reduction device has the effect of decreasing the antenna gain factor of the dockee.

By reducing the efficiency of the antenna(s) of the dockee, the carrier sense mechanism in the dockee becomes less sensitive to signals from other devices (e.g., devices 130, 140, 150, 160 and 170 in FIG. 1): the signal increases the signal strength threshold values X and X+Y to higher (stronger-signal) values in the CSMA mechanism described above. This means that the dockee can use channel C more often to send messages to the docking station, because its carrier sense mechanism ignores, preferably all, but at least some, of the cases where other devices are using the channel. With the dockee being able to use the channel more often than before, channel efficiency is improved for the dockee.

An additional technical benefit which may be achieved is that the dockee, when it is receiving data from the docking station, is less sensitive to interference from other devices that are using the same channel.

A further additional benefit which may be achieved is that the antenna efficiency reduction device may decrease the signal strength which the dockee can use to send messages. This means that other devices (e.g., 130, 140, 150, 160 and 170 in FIG. 1) are less likely to experience performance degradation due to the higher channel use of the dockee.

Note that for the case of Wi-Fi being used, the dockee will often include a signal strength regulator that automatically reduces the signal strength to a lower level when the receiver is nearby, as is the case with the docking station. Whether this regulator is present, either as an automatic system or as a manually controlled system, is up to the manufacturer. Therefore, an optional embodiment includes an automatic signal strength regulator, and another optional embodiment includes a manually controlled signal strength regulator.

In an embodiment of the invention referring to FIG. 3, the antenna efficiency reduction device is a detuner for detuning the antenna 314 and possibly other antenna elements attached to the radio 312, with detuning as disclosed hereinabove.

In another embodiment of the invention, the antenna efficiency reduction device acts as a radio wave absorber, reflector, or shield, thereby reducing the electromagnetic field coupling between the dockee (and optionally the docking station) and other devices in the vicinity.

Another preferred but optional, embodiment is that the docking station is equipped with an antenna, in a location close to the antenna(s) of the dockee, and/or with a directional sensitivity that is aimed at the location(s), where the antenna(s) of the dockee is or might be, in order to support communication between the dockee and the docking station.

The close placement and/or directionality of the antenna has the technical benefits of (a) creating a high enough link budget (link quality) for communications between the dockee and the docking station even though the antenna of the dockee has been detuned, and (b) allowing the dockee and the docking station to decrease the transmission power that they use to communicate, thereby ensuring that other devices are less likely to experience a performance degradation due to a high channel use of the dockee and/or the docking station.

It is not a requirement that the cradle contain a radio that is connected to the antenna—the radio might be in another device that is attached to the cradle with a wire. In one embodiment, the cradle has a USB cable by which it can be plugged into a computer, such that the combination of cradle and the computer can work as a docking station.

Figure 3:
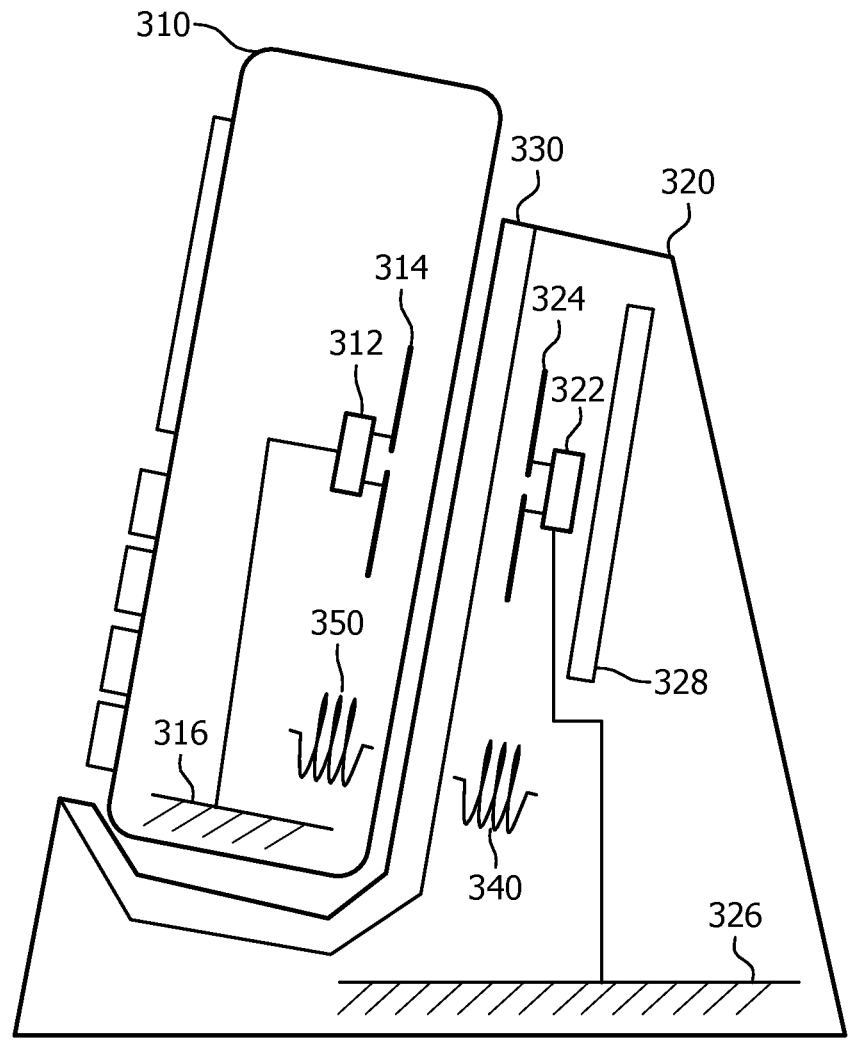
FIG. 3 shows a dockee and a docking cradle in accordance with an embodiment of the invention.

FIG. 3 shows a dockee and a docking station in accordance with an embodiment of the invention. The dockee device 310 has a radio 312 connected to an antenna 314 and optionally to a ground plane 316. The antenna 314 may include a single antenna element, two similar shaped elements (shown as a dipole in FIG. 3), or an array of antenna elements in an appropriate shape and form. The docking station 320 has a radio 322 connected to an antenna 324 and optionally a ground plane 326. The docking station 320 also contains a detuning device 328 acting as an antenna efficiency reduction device by reducing the sensitivity of the carrier sense mechanism in the dockee. Here, the detuning device is realized as a conducting piece of metal. The geometry of the docking station 320 together with the alignment structure 330 ensures that the piece of metal is properly aligned with the antenna 314 when the dockee 310 is physically docked, so that the detuning effect can take place. When the dockee is physically undocked, removed from the cradle, the detuning effect disappears, allowing the dockee to function as a regular Wi-Fi device if desired. The docking station 320 is shown as a cradle, but may take on various forms.

In this embodiment, the alignment structure 330 is realized by designing the shape of the docking station 320 so that the dockee 310 is always located in the same location when placed in the docking station 320. The buttons and screen on the front of the dockee 310 create a visual clue for the user of the dockee 310, causing the user to place the dockee 310 with the screen at the top facing outward. Part of the alignment is therefore not forced by the shape of the docking station itself—this shape would not prevent the dockee 310 from being placed in the docking station 320 with the back of the dockee 310 facing outward, preventing a good alignment—but because the designs of the dockee 310 and the docking station 320 create a natural inclination for the user to place the dockee 310 in a certain orientation, even though its symmetric design allows other orientations.

Note that the locations of the antennas can be different from what are shown in FIG. 3. For example, some dockee devices can have their antennas at the bottom edge in order to have more elegant corresponding docking station designs.

In some embodiments of the invention, the docking station contains multiple antennas as a means to (a) accommodate a larger class of dockee devices (more manufacturers, models, types), by having separate antennas optimized for separate members of the class and/or (b) simplify the design of the alignment structure, by giving the alignment structure multiple antennas to choose from when it comes to creating an alignment, and/or (c) creating MIMO antenna configurations for the communication between the dockee and the docking station.

The multiple antennas can all be connected to the antenna connection(s) of the docking station radio 322. These connections might also be activated via switches so that one specific antenna (or set of antennas) can be selected, or the signals might all be electrically added, relying on the fact that the antenna that is best positioned will pick up the strongest signal, and that the mixing in of possible weaker signals from the other antennas will not seriously degrade the link quality.

In an embodiment of the invention, the alignment structure 330 is also used, besides aligning the antenna efficiency reduction device and/or some or all of the antennas in the docking station with the dockee, to ensure that an optional wireless charging coil 340 in the docking station 320 is aligned with a wireless charging coil 350 in the dockee 310. This has the advantage, over conventional wireless charging solutions where a charging pad can be equipped with many coils, that fewer coils are needed in the docking station 320 and/or the dockee 310, and that the subsystems controlling the charging can be simplified with respect to solutions that have to handle multiple coils or greater tolerances in coil alignment.

Figure 4:
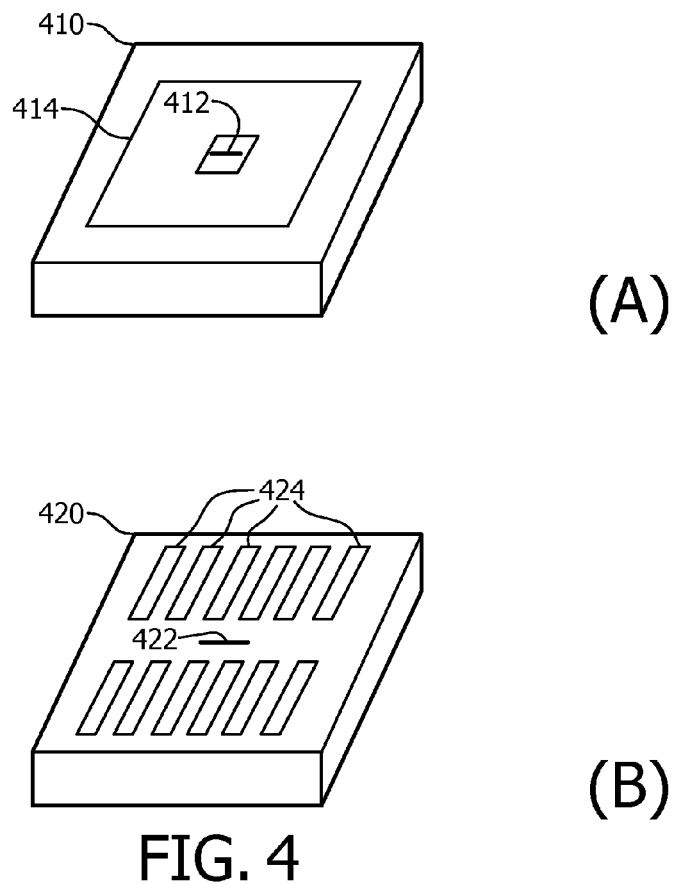
FIG. 4 shows docking pads in accordance with two embodiments of the invention.

FIG. 4 shows two embodiments of the invention where the docking station is realized as a docking pad.

In FIG. 4(A) the docking station 410 is a docking pad with a radio antenna 412 at a preferred location. The detuning device 414 is realized as a conductive metal sheet located, for example, just under the surface of the docking pad.

In FIG. 4(B) the docking station 420 is a docking pad with a radio antenna 422 at a preferred location. The detuning device 424 is realized as a number of conducting strips located, for example, just below the surface of the docking pad. This design assumes that the dockee is placed onto the docking pad so that the antenna in the dockee is parallel to the direction of the conducting strips. A design allowing more random placement of the dockee can be made using a more complex design of the detuning device, for example having a second layer of conducting strips at a 90 degree angle under the first layer, both layers being electrically isolated.

In yet another embodiment of the invention, the antenna system in the docking station is designed to compensate for the presence of the antenna efficiency reduction device, where the antenna in the docking station is designed and placed by taking the presence of a detuning device into account. It is a common activity in antenna design for small products to adapt the antenna design to compensate for detuning by large conductive objects (e.g. batteries, metal plates) in the product—compensating for a detuning device can be done using the same design techniques.

Another embodiment of the invention is to implement an antenna efficiency reduction device that can be switched on or off. Such an antenna efficiency reduction device can be realized, for example, as a detuning device by putting a mechanical or electronic switch between two conductive elements, so that they have a lower or absence of the detuning effect when the switch is opened.

Figure 1:
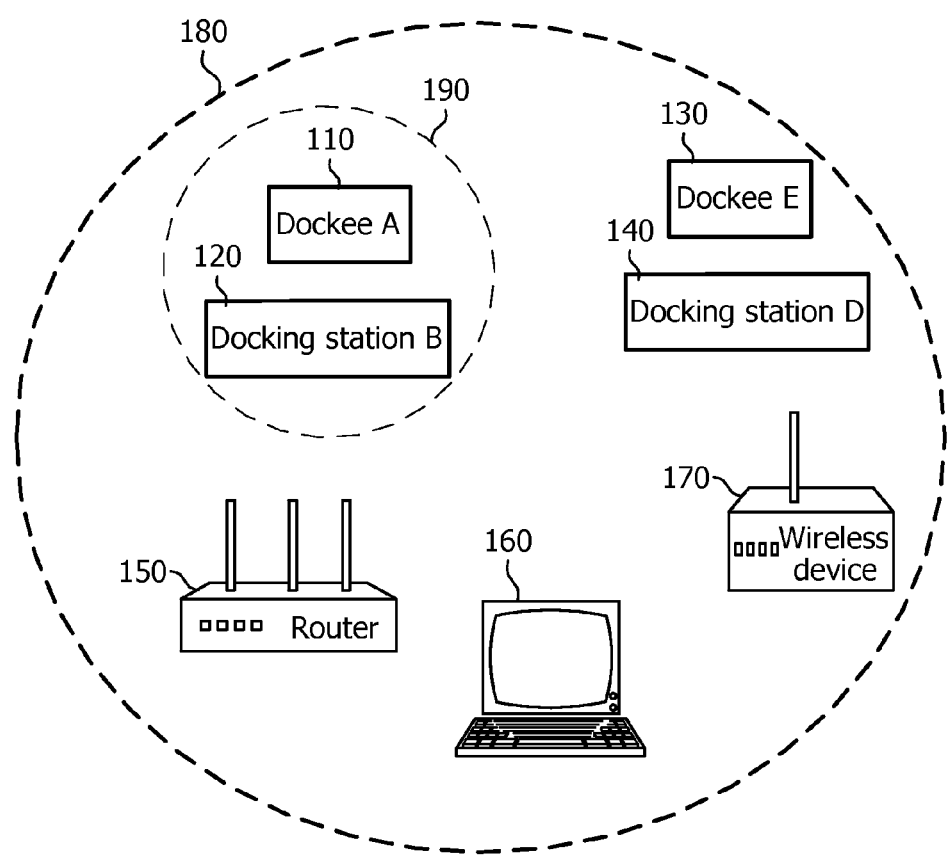
FIG. 1 shows multiple wireless devices using the same channel or overlapping channel.

A benefit of the above feature is that it allows the dockee to communicate more easily with far-away devices, e.g., the Wi-Fi router 150 in FIG. 1, while physically docked. Such communication can, for example, be used if the dockee wants to maintain, or occasionally use, an Internet connection via the Wi-Fi router 150. When it sends a packet to the Wi-Fi router 150, or tries to receive packets from the Wi-Fi router 150, the antenna efficiency reduction device is switched off. The antenna efficiency reduction device is switched on for some or all of the time when the dockee tries to communicate with the docking station 120. The Wi-Fi standard contains elements that allow the dockee to prevent the Wi-Fi router 150 from attempting to send packets to the dockee during the time when the antenna efficiency reduction device is switched on.

Yet another embodiment of the invention is to make the docking station act as a relay for the dockee, when the dockee wants to access other network devices, like the Wi-Fi router 150 in the area 180. This relaying is beneficial because the antenna efficiency reduction device may make it impossible for the dockee to send or receive packets over the distance to the Wi-Fi router 150. Relaying can happen at several different protocol layers, for example at the (Wireless) Ethernet layer or at the IP layer.

Another embodiment of the invention provides a control system that mechanically or electronically controls the antenna efficiency reduction device in order to regulate at an optimal level the amount of reduction created in the dockee. The control system might include a feedback loop incorporating signal strength values measured by the radio of the dockee. A controllable antenna efficiency reduction device can be made using, for example, a detuning device incorporating an electronic switch, as described above, that can be steered to let a variable amount of current through. Another way to make a controllable detuning device would be to mechanically change the orientation of the conducting elements of the detuning device with respect to the dockee.

The benefit of this control system is that a larger range of dockee device types with different antenna locations and/or a larger number of geometric relations in physical docking can be accommodated. The control might alter both the amount of detuning delivered, and/or the location(s) where a certain amount of detuning is delivered. An additional benefit may be that mechanical design tolerances in the dockee and the docking station can be larger.

In another embodiment of the invention, if the docking station is a cradle, multiple antennas and/or antenna efficiency reduction devices are included with the cradle, at multiple locations, so that many different dockee device types, with different antenna locations and/or characteristics, can all be accommodated.

Figure 5:
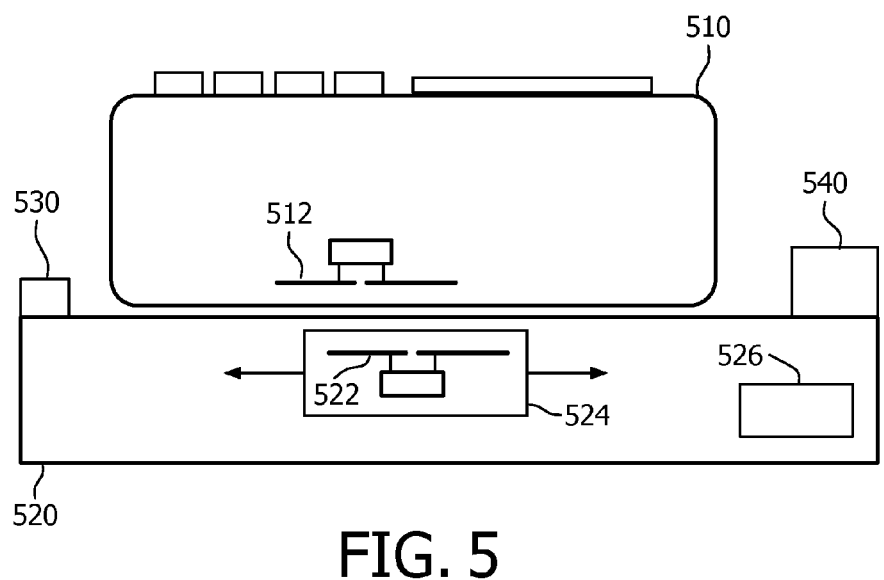
FIG. 5 shows a docking pad/cradle in accordance with an embodiment of the invention.

In another embodiment, as shown in FIG. 5, the docking station 520 includes at least a moving part 524 on which at least one antenna 522 is mounted, where this moving part 524 can be made to move using a movement mechanism 526, in order to move to a location where the antenna 512 of the dockee 510 is aligned with the antenna 522. Note that the moving part 524 is not limited to only move in a straight line in one direction. The moving part 524 might be capable of 2D movement, or might be able to describe a circular movement or movement along a particular track. If the moving part 524 is not capable of full 2D movements, this might be compensated for by mounting multiple antennas on the moving part 524, e.g. in a direction perpendicular to the direction of motion.

Note that this embodiment can be combined with the alignment structure 530 and 540 to constrain the boundaries of the location of the dockee, so that the needed extent of the motion of moving part 524 can also be constrained. Because of the edges 530 and 540 being on the side, the shape in the figure could be called both a pad (because it is mostly flat) and a cradle, because it constrains the positioning of the dockee in more than one dimension.

In a preferred embodiment, the movement mechanism 526 is an electromechanical system with one or more motion actuators.

In another embodiment, the movement mechanism 526 is realized using magnetic fields between the dockee 510 and the docking station 520. As an example, a permanent magnet is placed in the moving part 524, and an electromagnet is placed in the dockee which is switched on for a short period at the start of docking in order to create a correct alignment. A charging coil can double as such electromagnet.

In an embodiment, the dockee is mechanically moved by the docking station in order to reach a position and orientation where an alignment between the antennas in the dockee and the docking station exists.

This movement may be realized using magnetic fields between the dockee and the docking station. For example, where permanent magnets in a dockee are found, a magnetic coupling is made to them to pull the dockee in certain directions.

Alternatively, the dockee may be placed in or on a moving carriage of the docking station, such that the docking station can move with respect to the location of the antenna in the docking station. As an example, the moving carriage can be a rectangular piece of plastic, slightly larger than the shape of a dockee, equipped with permanent magnets by which the moving carriage can be pulled in certain directions.

In another alternative, vibration is used by the docking station to make the dockee move. By vibrating the surface of a pad in certain ways, it is possible to make the objects lying on the pad move in certain directions. This vibration could be realized using piezo elements, and/or using a vibrating plate.

In an embodiment, movement of the dockee is achieved with mechanical actuators that are in contact with the dockee, for example, pushers or conveyor belts.

In another embodiment, movement of the dockee is achieved in whole or in part by gravity, by making the docking station bowl-shaped or by making it an inclined plane with a ridge at the bottom.

Note that some the above embodiments can also be combined. For example, the dockee might be moved along a horizontal axis and a moving part in the docking station along a vertical axis.

The motions made in the above embodiment can be controlled by a control mechanism that uses the measured the signal strength between the dockee's antenna and the docking station's antenna as an input. If only this single signal strength is available, then typically back-and-forth trial movements have to be made in order to find the optimal location. If multiple antennas are available to the docking station from which signal strengths can be obtained, then the correct direction of movement can often be derived by considering the relative strengths of the signals.

Note also that the above embodiments could optionally be designed to accommodate not just a single dockee, but multiple dockees at the same time. For example, the docking station can achieve this by using multiple antennas.

Figure 6:
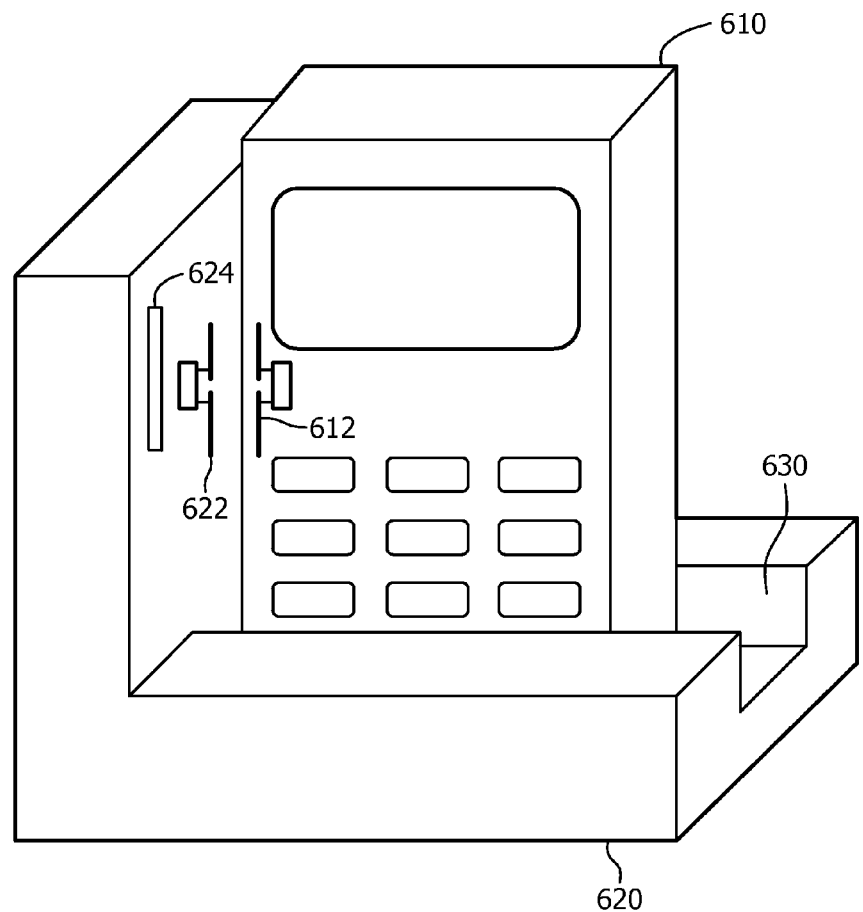
FIG. 6 shows a dockee and a docking cradle in accordance with an embodiment of the invention.

In another embodiment, as shown in FIG. 6, the docking station 620 is realized as a slotted structure, open on one side and closed on the other, with the expectation that the user places the dockee 610 in close proximity to, or touching, the closed side of the slot 630, such that the antenna 612 of the dockee 610 aligns with the detuning device 624 of the docking station 620. The antenna 622 of the docking station may be optionally placed in alignment with the detuning device 624. This embodiment may advantageously allow the docking station to accommodate a larger set of dockees.

In yet another embodiment, the docking station is constructed in such a way that the alignment structure is configurable by the end user to provide a desirable alignment for a particular class of dockee devices with a particular range of shapes and range of antenna position(s). The docking station may contain mechanical parts that can be moved by the user, e.g. along a groove, or by the docking station providing optional parts that can be added by a user. For example, certain plastic shapes that can be slotted into a hole may be optionally included.

In yet another embodiment of the invention is that the antenna efficiency reduction device and the antenna in the docking station are not realized as isolated subsystems, but as a single subsystem. The single subsystem provides an electrically conductive structure that acts both as an antenna and as a detuning device.

Figure 7:
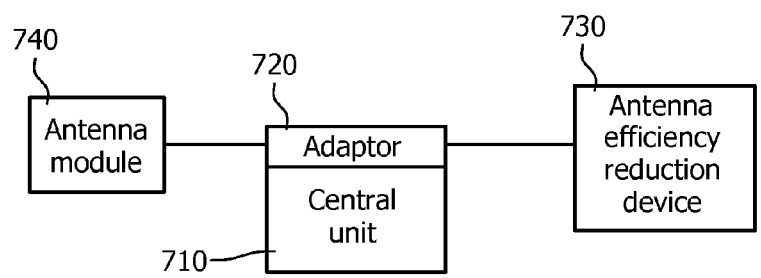
FIG. 7 shows modular components of a docking station in accordance with an embodiment of the invention.

As shown in FIG. 7, another embodiment of the invention provides a docking station realized, not as a single monolithic product but, as parts containing a central unit 710, an antenna efficiency reduction device 730 and an antenna 740 provided separately, allowing an end user to combine them, using an adaptor. For example, a PC based docking station will typically be a PC as the central unit, with a cradle that includes both an antenna and an antenna efficiency reduction device being plugged into the PC by a USB cable.

A benefit of this feature is that a larger range of dockee models could be conveniently accommodated by designing antenna efficiency reduction devices for different models of dockee that can all work with the same cradle or pad including the antenna or even with a range of cradles and/or pad models. The antenna efficiency reduction device could come with an enclosure designed to slot into the cradle or pad, or slot onto the dockee.

This invention is applicable to wireless docking, and other situations in which a wireless connection needs to be made in a crowded radio environment, where the user has the liberty to place their wireless device in a certain fixed location.

Certain embodiments herein provide a link between a dockee and a docking station which is harder to monitor or jam from a distance. Usually encryption is used for secure communications, but an extra layer of protection provided by the invention is an advantage over other wireless docking solutions.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

Most preferably, the principles of the invention are implemented as any combination of hardware, firmware and software. Moreover, the software is preferably implemented as an application program tangibly embodied on a program storage unit or computer readable storage medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

The invention claimed is:

1. A docking station for wireless docking, comprising:
   a first radio connected to a first antenna for communicating with a dockee via a carrier sensing mechanism in a shared radio spectrum environment, the dockee including a second radio connected to a second antenna; and
   an antenna efficiency reduction device that reduces, in the dockee, sensitivity of the carrier sense mechanism to radio signals transmitted by other devices in the shared radio spectrum environment when the dockee is physically docked with the docking station, such that the dockee is unable to detect the radio signals or ignores the radio signals below a predetermined threshold from the other devices.

2. The docking station according to claim 1, wherein the antenna efficiency reduction device shifts a natural resonant frequency of the second antenna.

3. The docking station according to claim 2, wherein the antenna efficiency reduction device comprises a conducting metal that couples with the second antenna.

4. The docking station according to claim 2, further comprising a plurality of conducting metal strips that couple with the second antenna in the dockee.

5. The docking station according to claim 2, further comprising a plurality of conducting metal elements that are connected to each other via at least one resistor, and wherein the at least one resistor dissipates electromagnetic field power flowing through the plurality of conducting metal elements.

6. The docking station according to claim 5, wherein a connection to the at least one resistor is made via a switch.

7. The docking station according to claim 1, wherein the antenna efficiency reduction device attenuates the radio signals received by the dockee from the other devices.

8. The docking station according to claim 1, wherein the antenna efficiency reduction device makes the second antenna less efficient by creating an electromagnetic coupling between different elements of the second antenna that are designed to be electrically isolated from each other.

9. The docking station according to claim 1, wherein the antenna efficiency reduction device can be switched on or off.

10. The docking station according to claim 1, wherein the first radio in the docking station is connected to a plurality of antennas, and wherein each of the plurality of antennas is positioned such that a link budget is optimized for a particular type of dockee.

11. The docking station according to claim 1, wherein the docking station further comprises an alignment structure for aligning the dockee, such that the second antenna is aligned in a predefined configuration with the antenna efficiency reduction device in the docking station.

12. The docking station according to claim 11, wherein the alignment structure comprises a particular shape for the docking station to allow the dockee be placed into or onto the docking station only in a specific position.

13. The docking station according to claim 11, wherein the alignment structure comprises a moving part on which the first antenna is mounted, such that the moving part can be moved to a location where the first antenna is aligned with the second antenna.

14. A docking station for wireless docking, comprising:
   a central unit having a first radio;
   an antenna module connected to the first radio for communicating with a dockee via a carrier sensing mechanism in a shared radio spectrum environment, the dockee including a second radio connected to an antenna; and
   an antenna efficiency reduction module for reducing efficiency of the antenna in the dockee by reducing sensitivity of the carrier sense mechanism to radio signals transmitted by other devices in the shared radio spectrum environment when the dockee is physically docked with the docking station, such that the dockee is unable to detect the radio signals or ignores the radio signals below a predetermined threshold from the other devices, wherein the central unit has an interface for plugging into the antenna module and the antenna efficiency reduction module.

15. A method of providing a docking station, the method comprising:
   providing a first radio connected to a first antenna for communication with a dockee via a carrier sensing mechanism in a shared radio spectrum environment, the dockee including a second radio connected to a second antenna; and
   providing an antenna efficiency reduction device that reduces, in the dockee, sensitivity of the carrier sense mechanism to radio signals transmitted by other devices in the shared radio spectrum environment when the dockee is physically docked with the docking station, such that the dockee is unable to detect the radio signals or ignores the radio signals below a predetermined threshold from the other drives.

* * * * *